(12) United States Patent
Gao et al.

(10) Patent No.: US 11,372,304 B2
(45) Date of Patent: Jun. 28, 2022

(54) ELECTRODES FOR ELECTRO-OPTIC DEVICES AND METHODS OF MAKING THE ELECTRODES

(71) Applicant: GENTEX CORPORATION, Zeeland, MI (US)

(72) Inventors: Jian Gao, Cupertino, CA (US); George A. Neuman, Holland, MI (US); Kurtis L. Geerlings, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 134 days.

(21) Appl. No.: 16/724,699

(22) Filed: Dec. 23, 2019

(65) Prior Publication Data

US 2020/0233276 A1 Jul. 23, 2020

Related U.S. Application Data

(60) Provisional application No. 62/793,920, filed on Jan. 18, 2019.

(51) Int. Cl.
*G02F 1/15* (2019.01)
*G02F 1/03* (2006.01)
(Continued)

(52) U.S. Cl.
CPC .......... *G02F 1/155* (2013.01); *G02F 1/13439* (2013.01); *G02F 1/133502* (2013.01); *G02F 2001/1552* (2013.01)

(58) Field of Classification Search
CPC ...... G02F 1/155; G02F 1/1523; G02F 1/1525; G02F 1/1521; G02F 1/1533; G02F 1/03;
(Continued)

(56) References Cited

U.S. PATENT DOCUMENTS 4,331,385 A * 5/1982 Kondo .................. G02F 1/1523
359/269
8,432,598 B2 * 4/2013 Yeo ...................... G02F 1/13439
359/237

(Continued)

FOREIGN PATENT DOCUMENTS

KR 20180036105 A 4/2018
WO 2017175941 A1 10/2017

OTHER PUBLICATIONS

International Search Report dated Apr. 16, 2020, for corresponding PCT application No. PCT/US 2019/068246, 2 pages.
(Continued)

*Primary Examiner* — Dawayne Pinkney
(74) *Attorney, Agent, or Firm* — Price Heneveld LLP; Brian James Brewer (57) ABSTRACT

An electro-optic device is provided that includes a first substrate having an inner surface and an outer surface; a first electrode provided at the inner surface of the first substrate; a second substrate having an inner surface and an outer surface, wherein the inner surface of the second substrate faces the inner surface of the first substrate; a second electrode provided at the inner surface of the second substrate; and an electro-optic medium provided between the inner surfaces of the first and second substrates. The first electrode includes a metal mesh formed from metal tracings and having open areas between the metal tracings; and a first transparent conductive coating electrically coupled to the metal mesh and extending at least between the metal tracings so as to extend across the open areas.

17 Claims, 9 Drawing Sheets

(51) Int. Cl.
    *G02F 1/153*        (2006.01)
    *G09G 3/19*         (2006.01)
    *G09G 3/38*         (2006.01)
    *G02F 1/155*        (2006.01)
    *G02F 1/1343*      (2006.01)
    *G02F 1/1335*      (2006.01)

(58) Field of Classification Search
    CPC .......... G02F 1/0316; G02F 3/16; G02F 1/163;
                C09K 9/02; B60R 1/088; H04N 9/3137;
                                         H04N 9/22
    USPC ................ 359/265–275, 277, 245–247, 242;
                    345/49, 105, 107; 248/817; 438/929
    See application file for complete search history.

(56) References Cited

U.S. PATENT DOCUMENTS

| | | |
|---|---|---|
| 2011/0273824 A1 | 11/2011 | Tanase et al. |
| 2019/0137841 A1 | 5/2019 | Koo et al. |

OTHER PUBLICATIONS

Written Opinion of the International Searching Authority dated Apr. 16, 2020, for corresponding PCT application No. PCT/US 2019/068246, 4 pages.

\* cited by examiner

ELECTRODES FOR ELECTRO-OPTIC DEVICES AND METHODS OF MAKING THE ELECTRODES

FIELD OF THE INVENTION

The present invention generally relates to an electro-optic device and methods of making the same, and more particularly, to the construction of a transparent electrode for use in an electro-optic device, and more specifically in an electrochromic device.

SUMMARY OF THE INVENTION

According to one aspect of the present invention, an electrochromic device is provided comprising: a first substrate having an inner surface and an outer surface; a first electrode provided at the inner surface of the first substrate; a second substrate having an inner surface and an outer surface, wherein the inner surface of the second substrate faces the inner surface of the first substrate; a second electrode provided at the inner surface of the second substrate; and an electrochromic medium provided between the inner surfaces of the first and second substrates. The first electrode comprises: a metal mesh formed from metal tracings and having open areas between the metal tracings; and a first transparent conductive coating electrically coupled to the metal mesh and extending at least between the metal tracings so as to extend across the open areas.

According to another embodiment of the present invention, an electro-optic device is provided comprising: a first substrate having an inner surface and an outer surface; a first electrode provided at the inner surface of the first substrate; a second substrate having an inner surface and an outer surface, wherein the inner surface of the second substrate faces the inner surface of the first substrate; a second electrode provided at the inner surface of the second substrate; and an electro-optic medium provided between the inner surfaces of the first and second substrates. The first electrode comprises: a metal mesh formed from metal tracings and having open areas between the metal tracings; and a first transparent conductive coating electrically coupled to the metal mesh and extending at least between the metal tracings so as to extend across the open areas.

According to another embodiment of the present invention, a method of making a transparent electrode for an electro-optic device is provided comprising: providing a substrate; applying a first transparent conductive coating on a surface of the substrate; depositing a metal mesh having a plurality of metal tracings on top of the first transparent conductive coating; and applying a second transparent conductive coating over the first transparent conductive coating and the metal mesh.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

The present illustrated embodiments reside primarily in combinations of method steps and device components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
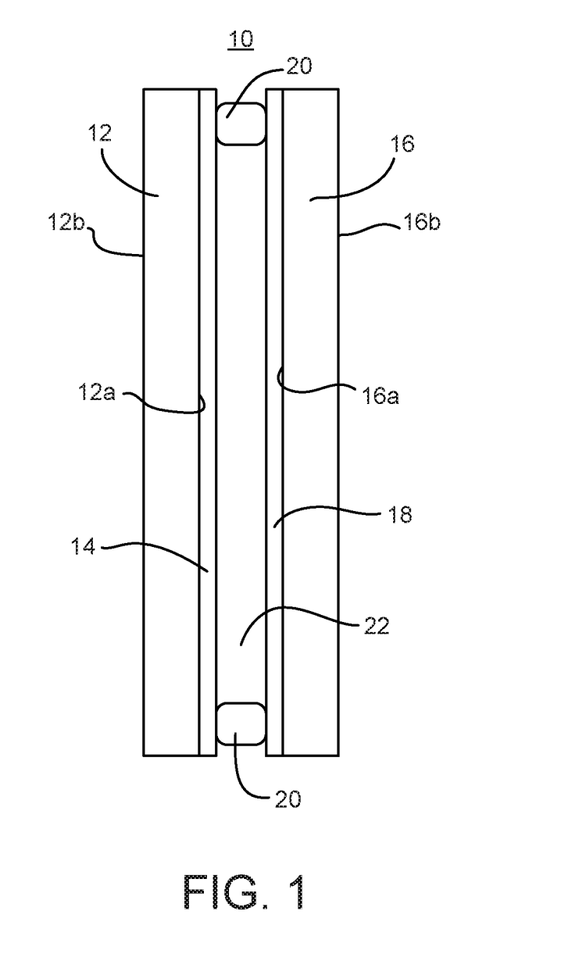
FIG. 1 is a cross-sectional view of an electro-optic device that may incorporate a metal mesh electrode.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

The embodiments described herein generally relate to an electro-optic device. FIG. 1 shows an example of the structure of an electro-optic device 10. The electro-optic device 10 may include a first substrate 12 having an inner surface 12a and an outer surface 12b; a first electrode 14 provided at the inner surface 12a of the first substrate 12; a second substrate 16 having an inner surface 16a and an outer surface 16b, wherein the inner surface 16a of the second substrate 16 faces the inner surface 12a of the first substrate 12; a second electrode 18 provided at the inner surface 16a of the second substrate 16; and an electro-optic medium 22 provided between the inner surfaces 12a and 16a of the first and second substrates 12 and 16. Although both of the first and second electrodes 14 and 18 are shown as being continuous coatings across the respective inner surfaces 12a and 16a, one of the electrodes 14 and 18 may alternatively be patterned depending upon the application. A perimeter seal 20 may be provided between the first and second electrodes 14 and 18 to provide a sealed chamber for containing the electro-optic medium 22.

Use of such electro-optical devices for imaging, display, and sensing, etc. usually involves signal modulation or energy conversion in the way of interaction between optical properties and electrical fields in certain materials. Depending on the applications, such modulation can be realized with absorptive, semi-transparent or transparent electrodes 14 and 18 with various electrical conductivity for different ranges of the optical spectrum from x-ray, ultra-violet (UV), visible, infra-red (IR) to radio frequency (RF) wave, etc. Whether it is an electrical signal or an optical signal that is to be generated, received or modulated, large dynamic range typically results in better efficiency, tunability or sensitivity. The optical property of metal, semiconductor, transparent conducting oxides (TCO), and dielectric materials varies with spectral range on transmission, reflection, and absorption. A metal, for example, is reflective in the visible and near infra-red (NIR) spectrum. In contrast, a semiconductor is transparent for IR and somewhat reflective in the visible spectrum and a dielectric material is transparent for visible and NIR light. The electrical conductivity of the semiconductors and dielectrics is relatively poor, thus limiting their use as electrodes. Compared to metals, which are more conductive, transparent conductive oxides (TCO) are one of the attractive materials due to their high transparency of visible light and acceptable electrical conductivity. TCOs are widely used in the display industry together with liquid crystal (LC). Since LC devices rely on a field effect to operate, the TCO layer is typically thin and has a high sheet resistance. In other technology, for example electrochromic (EC) devices, high current flow is demanded for fast optical modulation. The speed to coloration is primarily governed by the speed of electron flow and/or ionic diffusion.

Sheet resistance of a thin film electrode is defined as:

a. $R_s = \rho/d$

Figure 2:
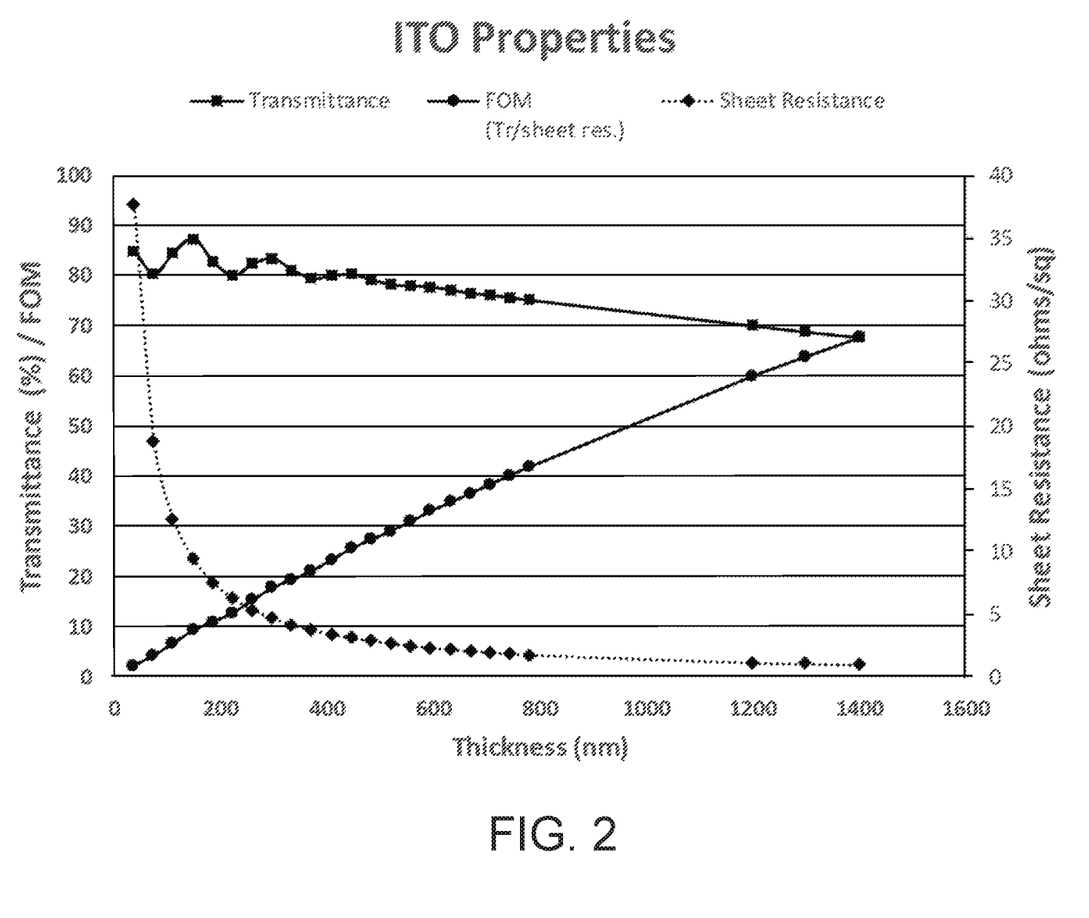
FIG. 2 is a graph of the transmittance, FOM, and sheet resistance of a transparent conductive oxide layer as a function of thickness.

In this equation, $\rho$ is the material bulk resistivity and d is the thickness. A thicker coating provides lower sheet resistance. Unfortunately, due to absorption, the thicker coating also introduces a negative impact on optical transparency. This also applies to a coating of a TCO. FIG. 2 shows the transmission, the sheet resistance, and Figure of Merit (FOM) (transmittance/sheet resistance) as a function of thickness for a common TCO, indium tin oxide (ITO) on glass substrate with air as the adjacent media. It is known that transmission and sheet resistance change with the thickness. The FOM is described in more detail below. The optical transmission of a complete electro-optic device 10, which typically employs two or more electrodes 14 and 18, will be a function of the product of the transmittance of the individual electrodes. For an electro-optic device 10 having a 2 ohm/square ITO electrodes 16 and 18, the transmission will drop to about 60% and the dynamic range may be limited. One other challenge occurs when devices require a larger surface area. The controlling speed slows down as current passes across a longer path and the potential drops as resistances are connected in series. The uniformity of functionality or efficiency degrades as a function of the distance from electrical contacts connected to the electrodes 14 and 18.

Figure 3A:
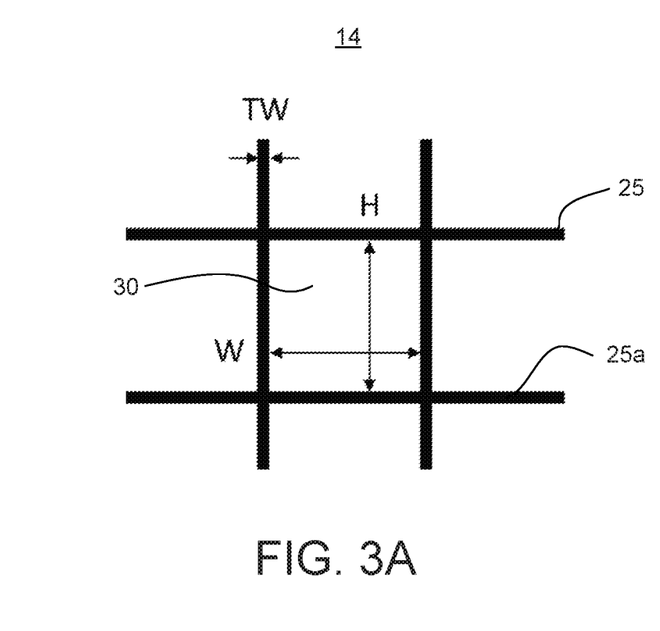
FIG. 3A is an example of a transparent electrode that may be used in the electro-optic device of FIG. 1 having a metal mesh structure and a transparent conductive coating.
Figure 3B:
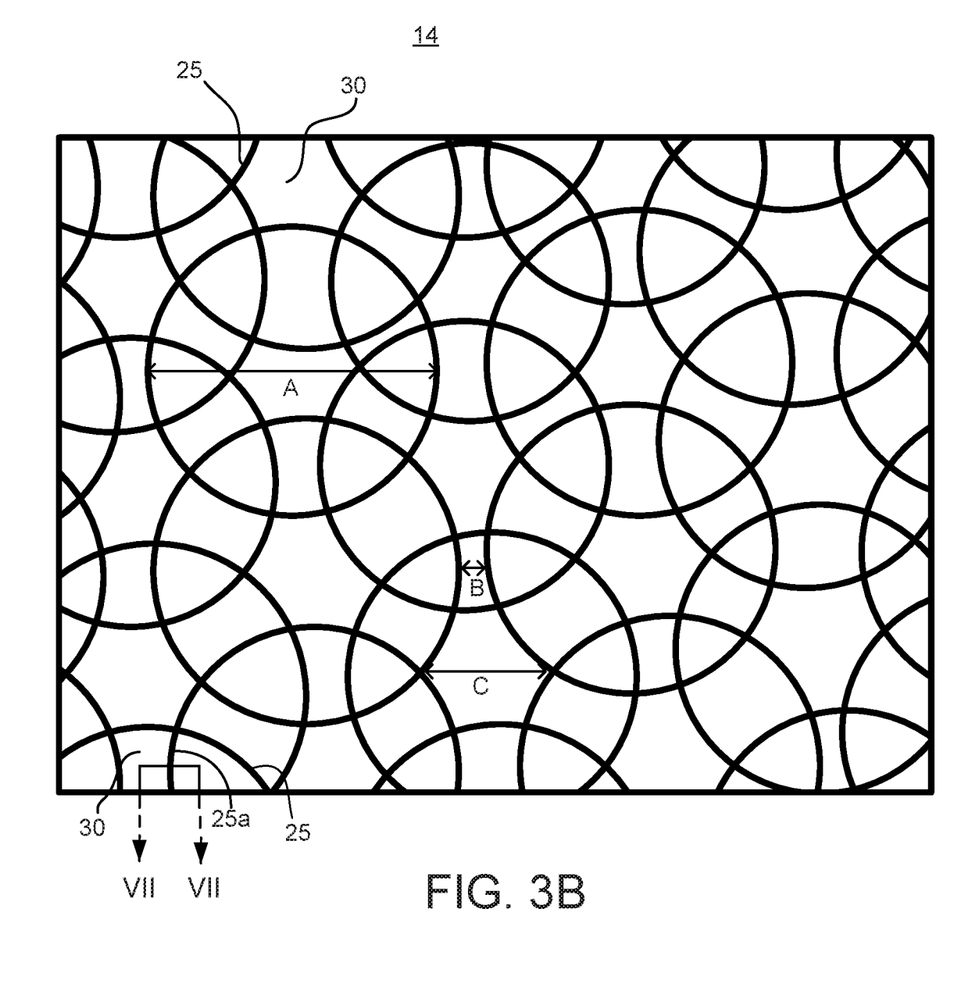
FIG. 3B is an example of a transparent electrode that may be used in the electro-optic device of FIG. 1 having a metal mesh structure and a transparent conductive coating.

To overcome these challenges associated with compromised performance, such as low Figure of Merit (FOM) values, metal mesh structures are proposed herein, which takes the benefit of high conductivity of metals or materials fabricated using nano-technology to shrink their sizes so that the majority of device surface can be left open for light to go through with low energy loss. Examples of the first electrode 14 are shown in FIGS. 3A and 3B. The first electrode 14 may include a metal mesh 25 formed from metal tracings 25a and having open areas between the metal tracings 25a, and a transparent conductive coating 30 electrically coupled to the metal mesh 25 and extending at least between the metal tracings 25a so as to extend across the open areas. FIG. 3A shows a regular grid pattern with perpendicular traces interconnected to form a checkerboard pattern. The open area is a product of the width "W" and height "H" between the traces 25a. The trace width "TW" is shown also in the diagram. The percent open area is calculated by taking $H*W/((H+TW)*(W+TW))$. The open area increases with increasing H and W and decreases with increasing TW. The percent open area may be greater than about 60%, greater than about 70%, greater than about 80%, or greater than about 90%.

Figure 4:
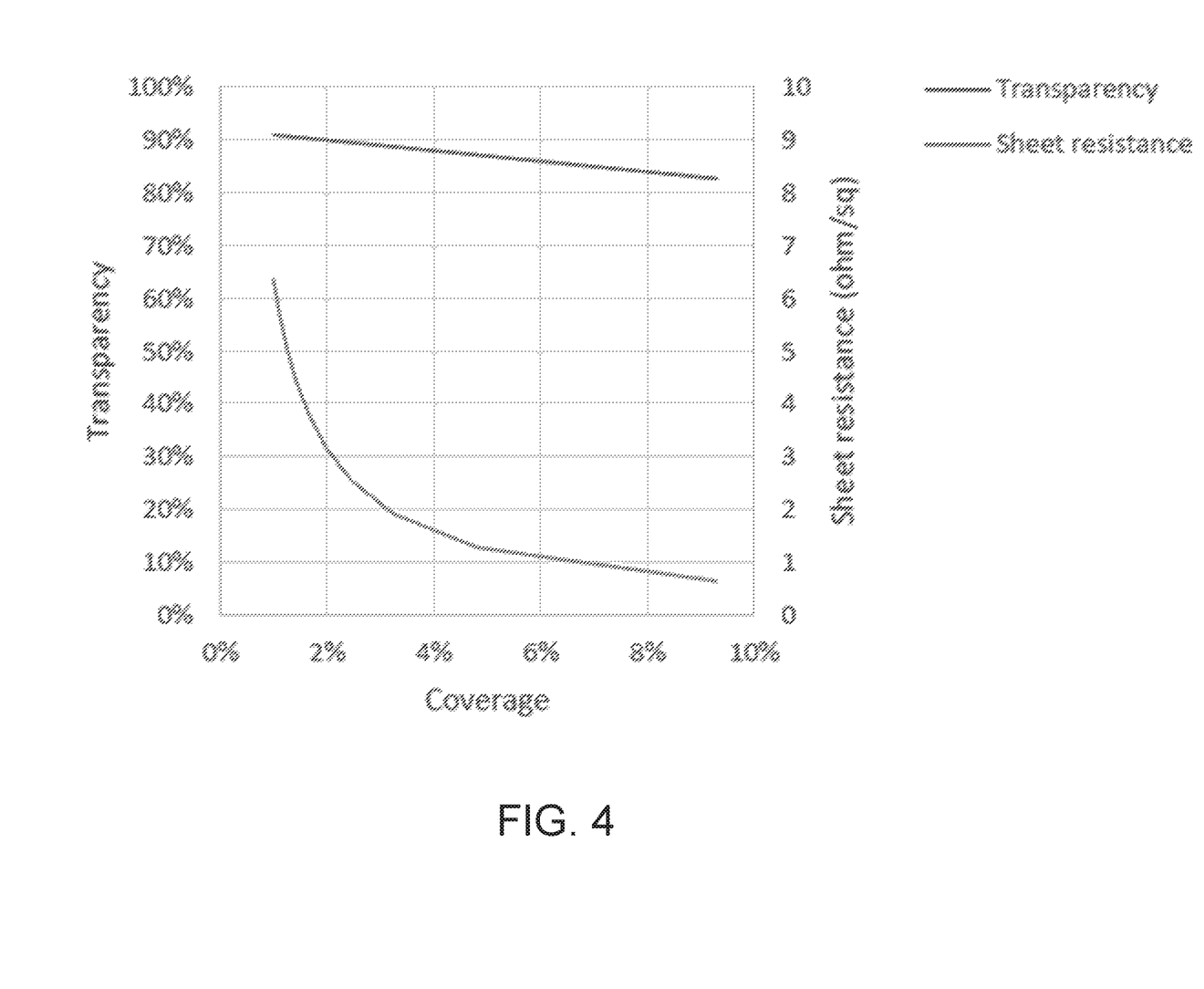
FIG. 4 is graph of the transmittance and sheet resistance of a metal mesh as a function of coverage area.
Figure 5:
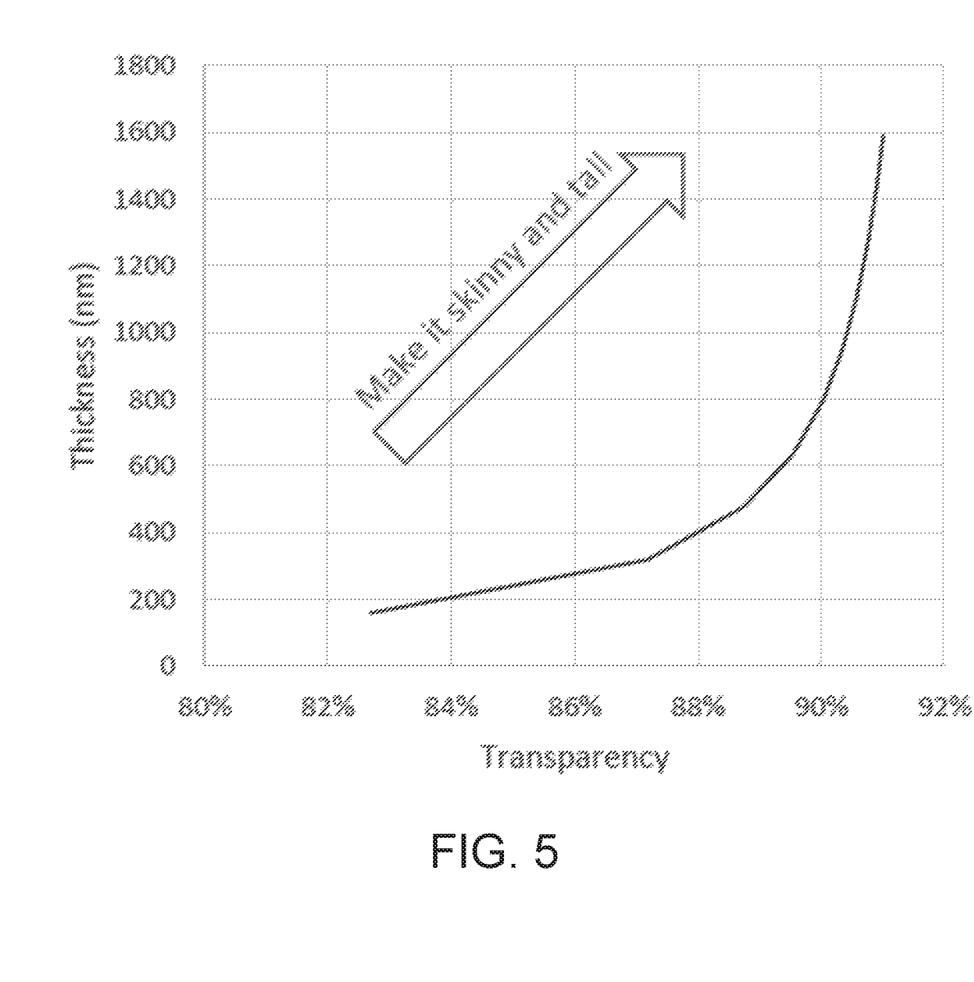
FIG. 5 is a graph of the transparency versus thickness of a simulated coating thickness for 2 ohm/square silver mesh when varying coverage.

Depending on the percentage of coverage of the metal mesh 25, the transparency and conductivity will theoretically decouple from each other and practically reach a balance eventually limited by fabrication methods such as lithography, printing or spray coating, etc. The structured material mimics highways to distribute electrons into its working places efficiently. Depending on how these highways are built, speed may vary based on how tall and wide they are and how joints are connected together. FIG. 4 shows the percentage of coverage versus transparency and sheet resistance of a 500 nm thick silver mesh on glass in theory if the periodic structures of the mesh are connected uniformly such as in a grid pattern depicted in FIG. 3A. For such metal coverage on raw glass, which has 92% transparency, increasing coverage percentage decreases transparency and sheet resistance for a fixed thickness. FIG. 5 shows thickness versus transparency of a simulated coating thickness for 2 ohm/square silver mesh when varying coverage. The graph in FIG. 5 shows that to maintain a high level of transparency, the coating thickness needs to be increased. There is a region (around 1000 nm) that high transparency can be achieved without too much difficulty in fabrication. On top of high transparency and conductivity, the electro-optic device can also benefit from better physical flexibility as some of the metals are more soft and elastic with bending compared with TCO, which is more brittle in crystalline form.

The transparency for the different metal mesh variants discussed above are for a free-standing coated substrate in air. There are reflectance losses in the open area which decreases the transmittance in the open areas. In the case of glass, the transmittance will be approximately 91% of the open area. This includes both reflectance and absorption losses. Table 1 below shows the percent open area as a function of the line width of the metals and the open area. This is for a grid pattern. The transmittance is then calculated using the open area times the 91% adjustment factor. When the metal mesh is placed in contact with an electro-optic media such an electrochromic media, the reflectance losses change due to the refractive index of the electrochromic media being larger than that of air. In the example of a fluid or gel based electrochromic media with a refractive index of about 1.45, the transmittance adjustment factor is 94.6%. If an ITO layer is added between the open area of the substrate and the electrochromic media, the adjustment factor is 92.9%. The values for these cases are shown in Table 1. Table 1 also shows the transmittance of a cell comprising two metal mesh substrates with ½ wave ITO in the open area between the metal traces. The transmittance is lower than one might expect simply from the percent open area in the mesh. Table 1 then shows the thickness using silver metal for the traces to attain a sheet resistance of 1, 0.5, and 0.1 ohm/sq. These calculations assume bulk properties of the silver and thus optimal electrical conductivity. It should be understood that the actual thicknesses will vary depending on the quality of the silver used in the traces. Alternate metals, as described elsewhere in this document may be used instead of silver. The thickness of the metals will scale with the conductivity of the metal relative to silver.

resistance. Higher FOM values translates to higher efficiencies. The transmittance may be the visible, UV, NIR, or some other range or combinations of wavelengths needed for a given application. Table 1 shows the FOM for the different options of line widths and open area. The FOM values are calculated for a single substrate using the transmittance which includes the ITO in the open area in a cell configuration. The FOM should be greater than about 10, greater than about 50, greater than about 100, or greater than about 500. The cell transmittance may be greater than about 30%, greater than about 45%, greater than about 60%, or greater than about 75%. The sheet resistance may be less than about 25 ohms/sq, less than about 10 ohms/sq, less than about 5 ohms/sq, less than about 2 ohms/sq, or less than about 0.5 ohms/sq. The trade-off with a metal mesh compared to a TCO is complexity and visual appearance. There are a few challenges that need to be taken care of. As for electrical conductivity, the metal mesh 25 pattern can be designed in a robust way so that it can stay connected and tolerate fabrication defects. Metal mesh 25 such as square, hexagon, or a ring structure could hold neighboring repetitive patterns together in lateral directions and provide continuity and flexibility. Between the neighboring traces 25a, a layer 30 (FIGS. 3A and 3B and 7) of TCO can be applied to distribute current from the metal mesh 25 to a localized area. The properties of layer 30 may be selected based on the requirements of a given application. In the situation where the transmittance needs to be optimized the optical thickness

TABLE 1

| Line Width (microns) | Open Gap (microns) | Percent Open | Single in Air Transmittance | Single in Cell Transmittance | ½ Wave ITO in Open Area in Cell | Cell Transmittance with ITO in Open Area | Silver Thickness (nm) for 1 ohm/sq (1.6 micro-ohm cm) |
|---|---|---|---|---|---|---|---|
| 5 | 75 | 88% | 80% | 83% | 82% | 67% | 132 |
| 5 | 100 | 91% | 83% | 86% | 84% | 71% | 172 |
| 5 | 200 | 95% | 87% | 90% | 88% | 78% | 332 |
| 5 | 500 | 98% | 80% | 93% | 91% | 83% | 812 |
| 10 | 75 | 78% | 71% | 74% | 72% | 52% | 72 |
| 10 | 100 | 83% | 75% | 78% | 77% | 59% | 82 |
| 10 | 200 | 91% | 83% | 86% | 84% | 71% | 172 |
| 10 | 500 | 96% | 87% | 91% | 89% | 80% | 412 |
| 20 | 75 | 62% | 57% | 59% | 58% | 34% | 42 |
| 20 | 100 | 69% | 63% | 66% | 65% | 42% | 52 |
| 20 | 200 | 83% | 75% | 78% | 77% | 59% | 82 |
| 20 | 500 | 92% | 84% | 87% | 86% | 74% | 212 |

| Silver Thickness (nm) for 0.5 ohm/sq (1.6 micro-ohm cm) | Silver Thickness (nm) for 0.1 ohm/sq (1.6 micro-ohm cm) | FOM (trans-½ wave in open/1 ohm/sq sheet resistance) | FOM (trans-½ wave in open/0.5 ohm/sq sheet resistance) | FOM (trans-½ wave in open/0.1 ohm/sq sheet resistance) |
|---|---|---|---|---|
| 264 | 1321 | 82 | 163 | 817 |
| 344 | 1721 | 84 | 169 | 843 |
| 664 | 3320 | 88 | 177 | 884 |
| 1624 | 8120 | 91 | 182 | 911 |
| 145 | 723 | 72 | 145 | 723 |
| 184 | 922 | 77 | 154 | 768 |
| 844 | 1721 | 84 | 169 | 843 |
| 824 | 4120 | 89 | 179 | 893 |
| 85 | 425 | 58 | 116 | 579 |
| 105 | 524 | 65 | 129 | 645 |
| 184 | 922 | 77 | 154 | 768 |
| 424 | 2121 | 86 | 172 | 859 |

Because the metal mesh 25 can be precisely engineered on line width, spacing, and height, the metal mesh 25 has the potential to be more efficient (transmittance/sheet resistance) than all the other technologies for a transparent electrode 14 and/or 18. A Figure of Merit (FOM) may be introduced which is the transmittance divided by the sheet may be at or about one half of the normal operating wavelength of the device so that it maximizes transmission with low loss by destructive interference on a glass region. The optical thickness corresponds to the product of the physical layer thickness multiplied by the corresponding refractive index for the operating wavelength inside the medium for each layer. For the case of devices operating in the visible spectral range, the operating wavelength may be 550 nm. Alternatively, layer 30 may comprise a conductive anti-reflection layer to minimize reflectance losses. Depending on the distance between the traces, different applications may require different local sheet resistance values. The sheet resistance between the traces may be less than about 1000 ohm/sq, less than about 500 ohms/sq, less than about 50 ohms/sq, or less than about 25 ohms/sq. In addition to TCO's, alternate materials such as nano-wire, graphene, conductive polymers or carbon nano-tube may be used to bridge the gap between the high conductive traces.

Figure 3C:
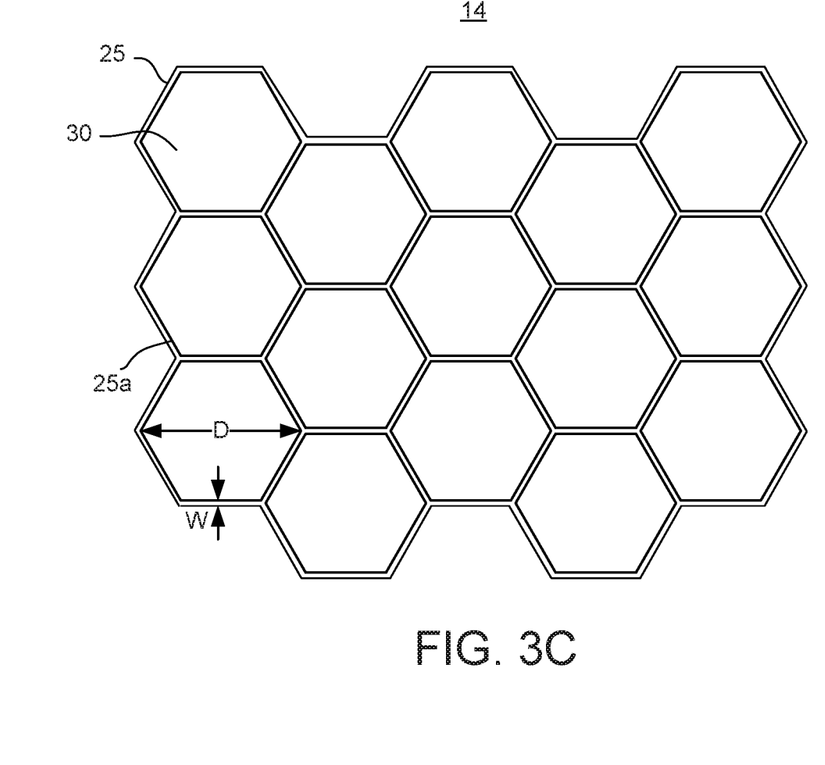
FIG. 3C is an example of a transparent electrode that may be used in the electro-optic device of FIG. 1 having a metal mesh structure.

With natural high reflectivity, the metal mesh 25 may generate visual discomfort in the way of haze. In extreme conditions such as very bright or very dark backgrounds, haze can be more profound in a sharp contrast. The surface morphology can be optimized with various fabrication methods to achieve clean edges thus eliminating angular refraction. The haze may be less than about 5%, less than about 2%, less than about 1%, or less than about 0.5%. Additionally, in some applications, it is preferred that the traces making up the metal mesh are not visible to the eye. This requires the absolute dimension of the patterns to be minimized for different viewing distances. FIG. 3C shows a metal mesh structure for which different trace and spacing characteristics were used to generate four different examples, which are described below. In a first example, the distance D across the hexagon is 85 microns and the trace width W is 27 microns. In the second example, the distance D across the hexagon is 185 microns and the trace width W is 29 microns wide. In the third example, the distance D across the hexagon is 380 microns and the trace width W is 34 microns. In the fourth example, the distance D across the hexagon is 769 microns and the trace width W is 34 microns. The characteristics of the examples were rated for transmittance and visibility of the traces. The first example had low transmittance (50%) and good invisibility. The second example had low transmittance (68%) and good invisibility. The third example had medium transmittance (80%) but one could slightly see the mesh. The fourth example had high transmittance (86%) and high visibility of the mesh lines. At a typical reading distance, the spacing could be set below 300 microns for human eyes to not resolve the distinct feature of the mesh 25. For other applications the spacing should be below about 500 microns, less than about 350 microns, or less than about 200 microns. It is known that repetitive patterns may result in diffraction patterns. U.S. Patent Application Publication No. 2016/0370680, incorporated herein by reference, teaches means to quantify diffraction patterns and defines acceptable levels. The diffraction intensity should be less than about 5, less than about 2.5, or less than about 1.5. The spatial frequency can be randomized to remove the diffraction patterns and rainbow colors caused by repetitive patterns that have a feature size on the same level of visible wavelength. For certain applications such as display, diffraction is disturbing and needs to be improved. FIG. 3B shows one example of a repetitive metal mesh 25 with a certain degree of randomization on size and position. This ring structure effectively removed the diffraction pattern in the far field since it diffracts light in all directions. In FIG. 3B, to give an idea of the relative scale of an exemplary metal mesh 25, the distance A represents the diameter of one of the rings and may be, for example, about 560 µm, the distance B represents the spacing between adjacent rings and may be, for example, about 65 µm, and the distance C represents the greatest distance between tracings 25a and may be, for example, about 260 µm. The width of the metal tracings 25a may be about 9 µm, for example. It is understood that in order to have a random structure that does not show diffraction, the size of the circles and their relative orientation need to vary. The nominal size will be selected to achieve desired sheet resistance and transmittance properties. The size and spacing will then vary from the nominal by about +/−50%, about +/−25%, by about +/−10%. In this manner, the diffraction will be minimized or eliminated.

Figure 6:
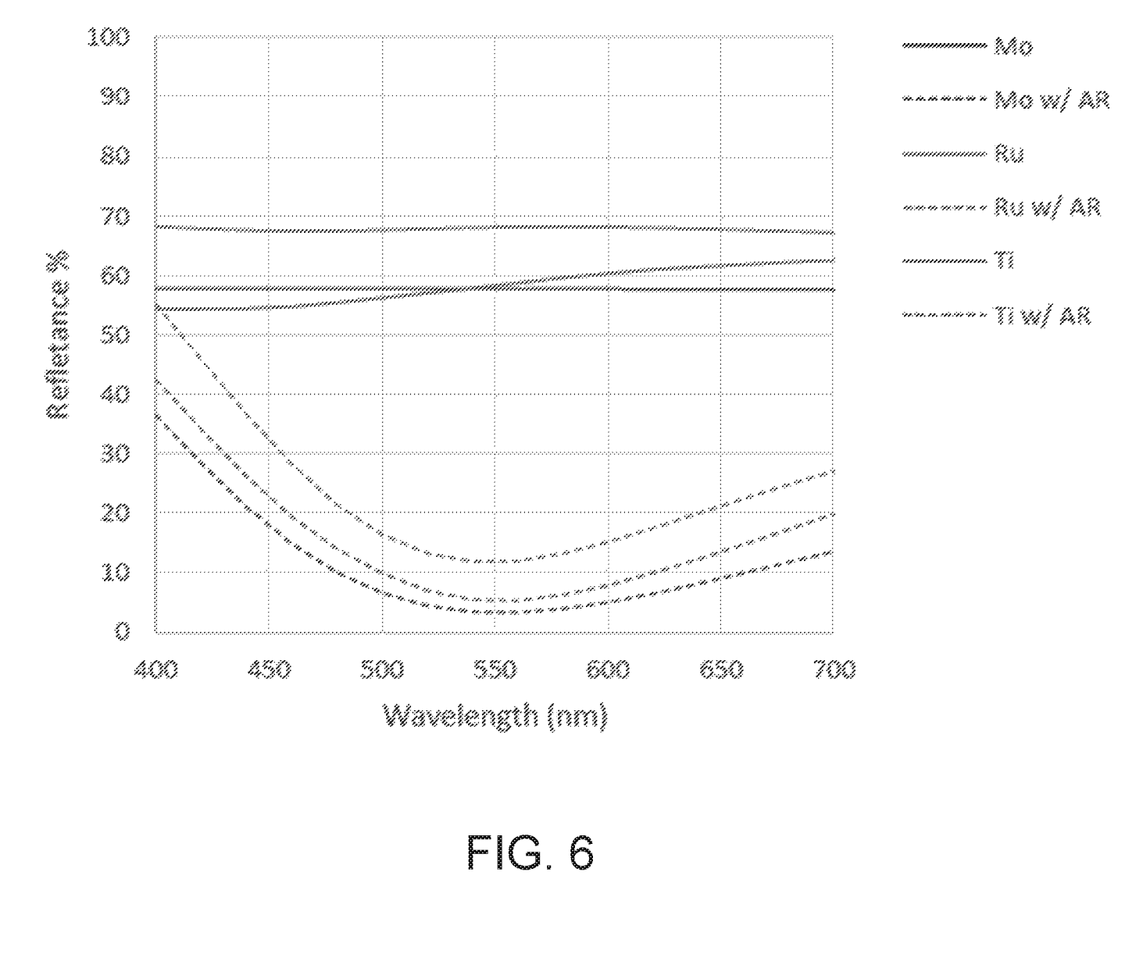
FIG. 6 is a graph of a reflectance spectrum for various metals with and without an anti-reflective coating.

There are also other ways to improve visual appearance and device efficiency. The use of high conductive metals such as silver, copper and gold result in relatively high reflectance values in the area of the traces. The reflectivity may be reduced, and thus the visibility of the mesh by choosing a mesh 25 made of a low reflectivity metal such as molybdenum, ruthenium, titanium or alloys. The entire trace does not necessarily need to be comprised by the low reflectivity metal. The low reflectivity metal may be located at the top and/or bottom interfaces to lower the reflectance of the traces. The reflectance may be further improved by applying anti-reflection (AR) coating between the metals and the viewer. Coating materials may include a dielectric coating, polymer, or ink etc. FIG. 6 shows reflectance spectrum for low reflection metals with and without an AR coating. It is clear that the AR coating can dramatically reduce reflection and improve the mesh appearance. The reflectance of the traces may be less than about 20%, less than about 10% or less than about 5%.

The proposed solution balances the electrical and optical improvements described above.

Figure 7:
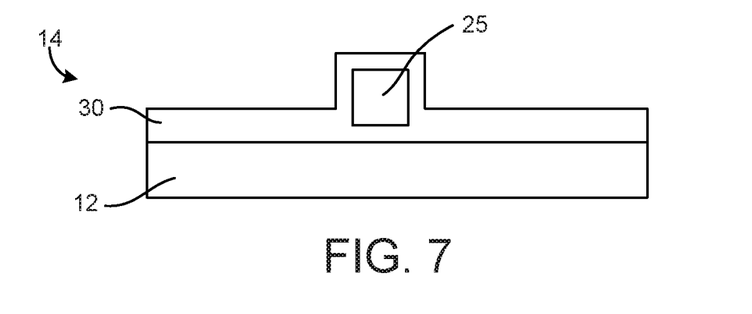
FIG. 7 is a cross-sectional view of a portion of the transparent electrode shown in FIG. 3A and 3B taken along line VII-VII.
Figure 8A:
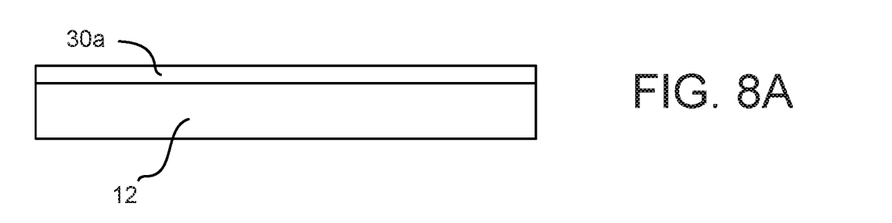
FIGS. 8A-8C are cross-sectional views of the portion of the transparent electrode shown in FIG. 7 at various stages of construction in the manufacturing method.
Figure 8B:
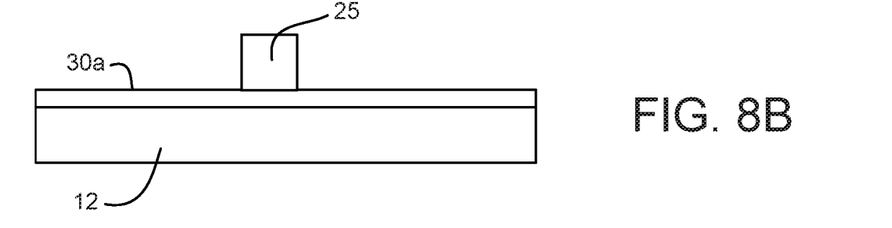
Figure 8C:
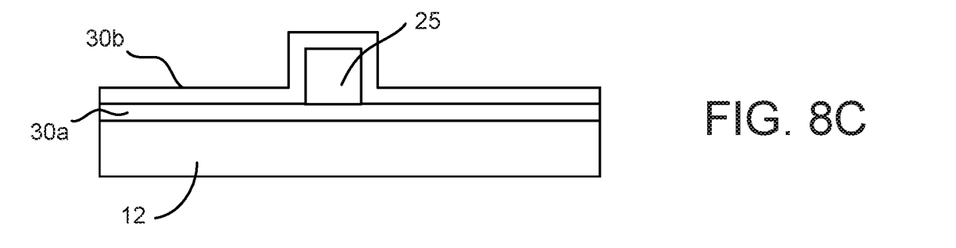

By using thin transparent material for layer 30 such as TCO or a conductive multilayer as an AR coating, electrical continuity can be well maintained on the metal traces 25a of the mesh 25 and the surrounding area. It effectively tolerates fabrication defects in the metal mesh process by helping electrons to hop over local voids and pinholes and thus directs current far into the large-area device. Due to higher refractive indices of various conductive coatings, the anti-reflection effect can reduce the refraction off the metal leaving a low-haze, crispy appearance. Depending on the application, the conductive layer 30 can be coated before and after the metal mesh process as shown in FIGS. 7 and 8A-8C to fully wrap the metal traces 25a so that all surfaces can benefit from the AR effect. The unique advantage of this type of structure is that not only can the metal mesh 25 benefit from the AR effect, but also the substrate 12. Because the transparent conductive layer 30 is coated twice as first and second coatings 30a and 30b, the substrate region receives twice as much material as that wrapping the metal region. By carefully controlling the thickness of individual coatings 30a and 30b, the combined coating layer 30 can maximize the transmission in the substrate region due to destructive interference. Thus, the method of making a transparent electrode (14 and/or 18) includes providing a substrate 12, 16; applying a first transparent conductive coating 30a on a surface of the substrate 12, 16 (FIG. 8A); depositing a metal mesh 25 having a plurality of metal tracings 25a on top of the first transparent conductive coating 30a (FIG. 8B); and applying a second transparent conductive coating 30b over the first transparent conductive coating 30a and the metal mesh 25 (FIG. 8C). The first and second transparent conductive coatings 30a and 30b may be made of the same or different materials. Indium tin oxide (ITO) is one example of a material for the first and second transparent conductive coatings 30a and 30b. If the same material is used for coatings 30a and 30b, the end product will appear as shown in FIG. 7, otherwise it will appear as in FIG. 8C.

The metal tracings 25a may be formed of a metal stack. The metal stack can be carefully structured with adhesion metal layers and conductive metal layers. The adhesion metal layers include adhesion between TCO to protection metal and between protection metal to conductive metal on all surfaces. The adhesion metal can be chosen from low reflectivity metals to facilitate AR effect while the protection metal can be chosen from chemically inert metals to provide chemical stability for the core conductive metal. For anodic application in a two-electrode system, material should be carefully chosen to prevent ionization-induced electro-migration. Take EC devices, for example, the adhesion can be chrome, nichrome, ruthenium, or molybdenum as well as a semiconductor such as silicon etc. The metal stack may include non-metal base coating during patterning for color correction. It is essentially a core and shell structure. On top of all metals, material like TCO further enhances the chemical stability by capping all surfaces. This type of anti-reflection metal mesh electrode can be used on single or multiple electrode systems with symmetric and asymmetric construction.

With the construction described herein, the electro-optic device 10 when embodied as an EC device exhibits low sheet resistance with high optical transmittance while maintaining darkening between tracings 25a and thus functions better than an electrochromic device just having TCO as an electrode. The low sheet resistance is attained by having a relatively high open area between tracings 25a, a high aspect ratio for the tracings 25a (the ratio of thickness to width), and the use of high conductivity metals. To attain sufficient darkening between traces 25a and uniformity of darkening the metal mesh 25 is combined with a conductive layer 30 between the traces 25a of the mesh 25, where the conductive layer 30 may include a TCO layer, a stack of ITO, metal, and ITO (an IMI stack), carbon nanotubes, graphene, silver nanowire, or conductive polymers, etc. Also choosing the appropriate thickness of the TCO and/or additional layers will minimize interferential transmittance losses.

It will be understood by one having ordinary skill in the art that construction of the described embodiments and other components is not limited to any specific material unless explicitly recited in the claims. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An electrochromic device comprising:
    a first substrate having an inner surface and an outer surface;
    a first electrode provided at the inner surface of the first substrate;
    a second substrate having an inner surface and an outer surface, wherein the inner surface of the second substrate faces the inner surface of the first substrate;
    a second electrode provided at the inner surface of the second substrate; and
    an electrochromic medium provided between the inner surfaces of the first and second substrates,
    wherein the first electrode comprises:
    a first metal mesh formed from first metal tracings and having first open areas between the first metal tracings;
    a first transparent conductive coating electrically coupled to the first metal mesh and extending at least between the first metal tracings so as to extend across the first open areas;
    a second transparent conductive coating positioned on an opposite side of the first metal mesh from the first transparent conductive coating; and
    the first and second transparent conductive coatings fully wrap the first metal tracings.

2. The electrochromic device of claim 1, wherein the first metal tracings are a stack of metallic materials.

3. The electrochromic device of claim 1, wherein a percent open area of the first metal mesh is greater than about 60%.

4. The electrochromic device of claim 1, wherein at least one of the first transparent conductive coating and the second transparent conductive coating functions as an anti-reflective coating.

5. The electrochromic device of claim 1, wherein the second electrode comprises:

a second metal mesh formed from second metal tracings and having second open areas between the second metal tracings; and a third transparent conductive coating electrically coupled to the second metal mesh and extending at least between the second metal tracings so as to extend across the second open areas.

6. The electrochromic device of claim 5, wherein the second electrode further comprises:

a fourth transparent conductive coating positioned on an opposite side of the second metal mesh from the third transparent conductive coating.

7. The electrochromic device of claim 1, wherein a combined optical thickness of the first transparent conductive coating and the second transparent conductive coating is one half the product of a physical combined thickness of the first and second transparent conductive coatings multiplied by a corresponding refractive index for the operating wavelength inside each transparent conductive coating.

8. The electrochromic device of claim 1, wherein the first and second transparent conductive coatings are the same.

9. The electrochromic device of claim 1, wherein the first and second transparent conductive coatings are different.

10. The electrochromic device of claim 1, wherein at least part of the the first transparent conductive coating is in the open areas.

11. The electrochromic device of claim 1, wherein the first metal mesh forms a plurality of rings having at least one of a diameter and a spacing that varies by about 25%.

12. A method of making a transparent electrode for an electro-optic device, the method comprising:

providing a substrate;

applying a first transparent conductive coating on a surface of the substrate;

depositing a metal mesh having a plurality of metal tracings on top of the first transparent conductive coating; and applying a second transparent conductive coating over the first transparent conductive coating and the metal mesh;

wherein the first and second transparent conductive coatings fully wrap the first metal tracings;

disposing the substrate in a spaced apart relationship with a second substrate having an electrode on an inner surface thereof facing the surface of the substrate; and providing an electrochromic medium between the surface and the inner surface.

13. The method of claim 12, wherein the second transparent conductive coating is made of the same material as the first transparent conductive coating.

14. The method of claim 12, wherein the first transparent conductive coating is made of indium tin oxide.

15. The method of claim 12, wherein at least one of the first transparent conductive coating and the second transparent conductive coating functions as an anti-reflective coating.

16. The method of claim 12, wherein the metal tracings are made of a stack of metallic materials.

17. The method of claim 12, wherein the combined optical thickness of the first transparent conductive coating and the second transparent conductive coating is one half the product of a physical combined thickness of the first and second transparent conductive coatings multiplied by a corresponding refractive index for the operating wavelength inside each transparent conductive coating.

* * * * *